United States Patent
van der Merwe

(10) Patent No.: US 8,705,853 B2
(45) Date of Patent: Apr. 22, 2014

(54) DETECTING SKIN TONE

(75) Inventor: Rudolph van der Merwe, Portland, OR (US)

(73) Assignee: Apple Inc., Cupertino, CA (US)

( * ) Notice: Subject to any disclaimer, the term of this patent is extended or adjusted under 35 U.S.C. 154(b) by 131 days.

(21) Appl. No.: 13/452,661

(22) Filed: Apr. 20, 2012

(65) Prior Publication Data

US 2013/0279802 A1    Oct. 24, 2013

(51) Int. Cl.
*G06K 9/00*    (2006.01)

(52) U.S. Cl.
USPC .......................................................... 382/165

(58) Field of Classification Search
USPC ......... 382/100, 118, 162–165, 181, 190, 254, 382/260; 348/223.1; 345/593; 396/166
See application file for complete search history.

(56) References Cited

U.S. PATENT DOCUMENTS

| | | | |
|---|---|---|---|
| 6,148,092 A | 11/2000 | Qian | |
| 7,184,578 B2* | 2/2007 | Simon et al. | 382/118 |
| 7,218,759 B1* | 5/2007 | Ho et al. | 382/118 |
| 7,634,108 B2* | 12/2009 | Cohen et al. | 382/103 |
| 8,031,961 B2* | 10/2011 | Nachlieli et al. | 382/254 |
| 8,238,654 B2* | 8/2012 | Pan et al. | 382/167 |
| 8,411,964 B2* | 4/2013 | Choi | 382/195 |
| 2006/0222242 A1 | 10/2006 | Hayaishi | |
| 2010/0194773 A1 | 8/2010 | Pan et al. | |
| 2011/0134275 A1 | 6/2011 | Nguyen | |

* cited by examiner

*Primary Examiner* — Jose Couso
(74) *Attorney, Agent, or Firm* — Fish & Richardson P.C.

(57) ABSTRACT

The disclosed implementations provide a system and method of detecting skin tone comprising receiving an image; determining a light intensity of the image; converting a color space of each pixel in the image into a converted value based on the light intensity; and selecting a classifier from a plurality of classifiers based on the light intensity; determining for each converted value, using the selected classifier, a probability that the converted value represents a skin tone; and detecting presence of skin tone in the image based on the determined pixel probabilities.

24 Claims, 5 Drawing Sheets

DETECTING SKIN TONE

TECHNICAL FIELD

This disclosure is related generally to detecting skin tone.

BACKGROUND

Systems can detect skin tones through pixel-based or region-based methods. Pixel-based methods classify each pixel as skin or non-skin individually, independently from the pixel's neighbors. Pixel-based methods identify color spaces and model color distributions to detect skin tones. Region-based methods take into account the spatial arrangement of skin pixels when classifying the pixels.

SUMMARY

The disclosed implementations provide a system and method of detecting skin tone. Depending on the light intensity of an image, the system converts the image into a corresponding color space. The system applies a corresponding classifier to the image in the converted color space. The system applies various techniques (e.g., filters), described below, to increase accuracy of the classification. Finally, the system detects skin tone by applying masks to the classified image.

In general, one innovative aspect of the subject matter described in this specification can be embodied in methods that include the actions of receiving an image; determining a light intensity of the image; converting a color space of each pixel in the image into a converted value based on the light intensity; selecting a classifier from a plurality of classifiers based on the light intensity; determining for each converted value, using the selected classifier, a probability that the converted value represents a skin tone; and detecting presence of skin tone in the image based on the determined pixel probabilities.

These and other embodiments can each optionally include one or more of the following features. The image includes RGB values. The converting of each pixel is a RGB to YUV conversion. The converting of each pixel is a RGB to normalized RGB conversion. The classifier is a feedforward neural network. Applying a morphology filter to the determined pixel probabilities. In response to the classifying, calculating a spatially weighted average for the image; scaling the spatially weighted average nonlinearly; applying a temporal queue filter to the spatially weighted average to generate a filtered value; and clamping the filtered value. Detecting user presence based on the determined pixel probabilities. Detecting user presence comprises: determining a threshold; and selecting, for each probability in the determined pixel probabilities, the probability that satisfies the threshold. The threshold is determined by a maximum a postieri probability estimate. The threshold is selected by a user.

Particular implementations of detecting skin tone can provide several advantages. The system can detect skin tone. This allows the system to detect user presence, track faces, or track hands (e.g., a hand gesture or robotic control) from an image or video source. The system can accurately detect skin tone under various light conditions of the image or video source.

DESCRIPTION OF DRAWINGS

The same reference symbol used in various drawings indicates like elements.

DETAILED DESCRIPTION

The disclosure that follows describes a system application that detects skin tone. The system application can be running on one or more server computers and be communicating with one or more remotely located devices using the Internet. The disclosed implementations can also be included in a "stand-alone" application running on a device.

Figure 1:
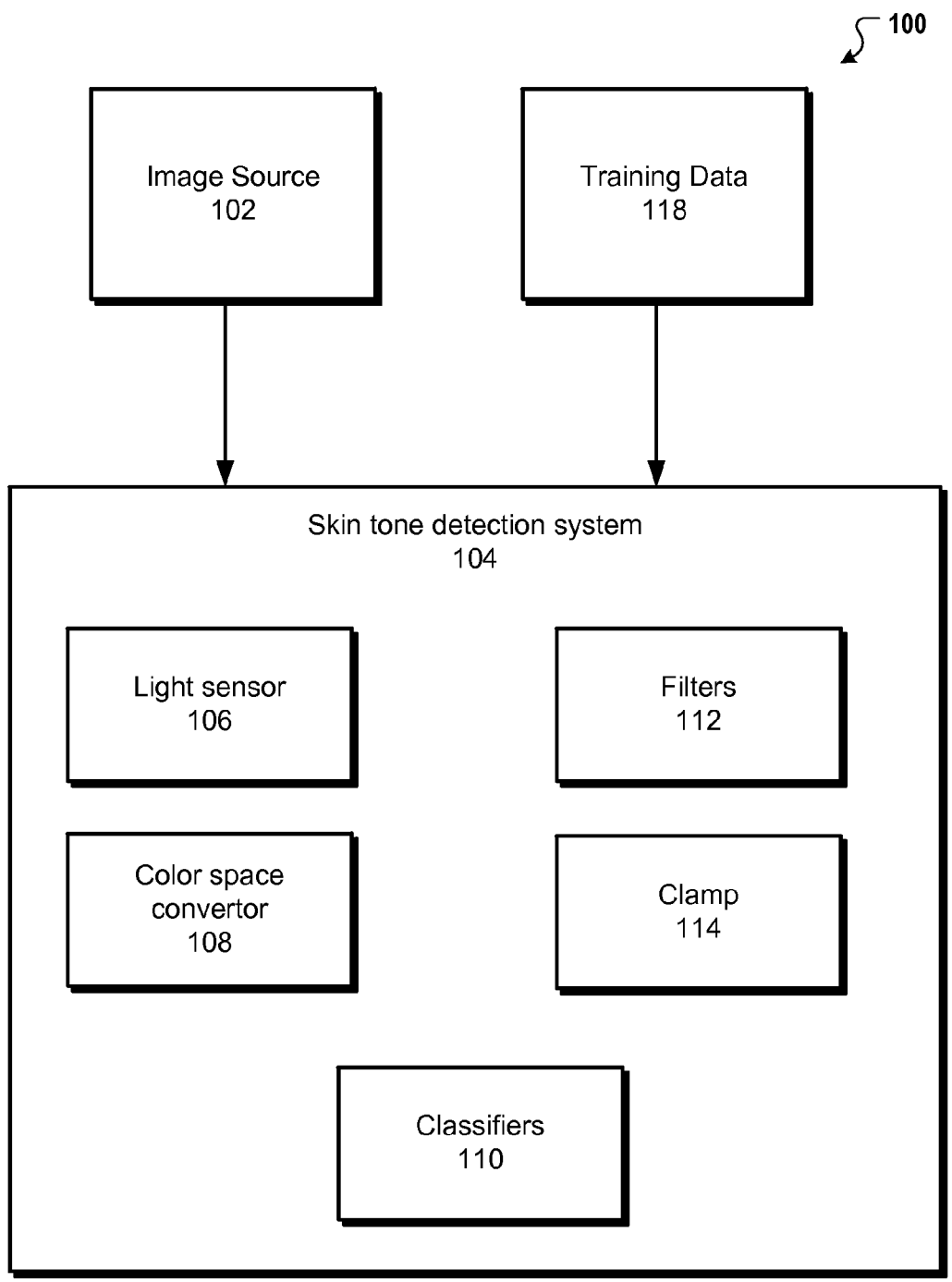
FIG. 1 is a block diagram of an exemplary system 100 that detects skin tone.

FIG. 1 is a block diagram of an exemplary system 100 that detects skin tone. The system 100 detects human skin tone, the color of which can vary. In practice, the system operates in a color classification space that is ethnicity agnostic. The system 100 includes an image source 102 and a skin tone detection system 104. The skin tone detection system 104 detects whether the image source 102 includes skin tone. In some implementations, the image source 102 is a video feed separated into multiple image stills. In some other implementations, the image source 102 is a single image. An image from the image source 102 can include pixels represented by red, green, and blue (RGB) values. Other representations are possible.

The skin tone detections system 104 includes a light sensor 106, color space convertor 108, classifiers 110, filters 112, a clamp 114, and masks 116. Each of these will be described further below.

The light sensor 106 detects a light intensity from the image source 102. For example, a sun lit office during the day can have a medium to high light intensity. On the other hand, a room lit by an accent light can have a low light intensity. In some implementations, a low light intensity is measured by a lux threshold. For example, if an image contains lower lux than the lux threshold, the image has a low light intensity. In some implementations, the skin tone detection system 104 receives information about the image source's light intensity (e.g., a light intensity measurement) from an external light sensor. For example, the light intensity can be provided as metadata by a sensor that is used for imaging (e.g., still or video camera). In alternative implementations, the light intensity measurement can be inferred through algorithmic processing of an input video or still feed. In some implementations, the system measures an average gray (e.g., luma) level of the image source 102. In alternative implementations, the system builds a histogram of a luma channel of the image source 102 (e.g., brightness) and deduce a light level from the density of the histogram. The skin tone detection system provides the light intensity measurement to the color space convertor 108.

The color space convertor 108 converts pixels from one color space to another color space using different mathematical conversions. These mathematical conversions include, but are not limited to, YUV conversions or RGB normalizations. For example, if the image source 102 is represented by RGB values, the color space convertor can convert the RGB values to YUV values or other color spaces. Upon receiving the image source 102 and the image source's light intensity measurement, as will be described further below in reference to FIG. 2, the color space convertor 108 converts the image source 102 and sends the converted values to classifiers 110.

The classifiers 110 process each converted color space value, where each color space value represents a pixel, into a probability that the value represents skin tone. The classifiers 110 are trained in a supervised fashion. The classifiers 110 initially process training data 118 to learn whether an image includes skin tones. Training data 118 can include already classified images that include and exclude skin tones. For example, skin tone and non-skin tone pixels can be provided to the classifiers 110 as positive and negative examples respectively. In some implementations, the size of a set of negative examples is equal to or larger than the size of a set of positive examples. The classifiers 110 learn a probabilistic mapping from the color space values of each pixel to a single probability value per pixel. The probability value can be the probability of a pixel representing skin tone. After processing the training data, the classifiers 110 can classify, on a per pixel basis, images sent from the image source 102 into probabilities. A variety of probabilistic classifiers can be used. For example, classifiers 110 can be artificial neural networks, support vector machines (SVMs), or regression-and-classification trees. The classifiers 110 can represent these probabilities as a probability map (e.g., also referred to as a heat map). An example of a probability map is shown further below in reference to FIG. 4. The classifiers 110 can include neural networks. For example, the neural networks can have an architecture of numInputUnits-numHiddenUnits-numOutputUnits. In some implementations, the neural networks include more than one hidden layers. The number of input units can be determined by the color space values, as will be described below in reference to FIG. 2. The number of hidden units can be determined through cross-validation. Cross-validation can occur during training of the classifiers 110. This process determines a number of hidden units that results in optimal classification performance on a validation set of data (e.g., training data) without negatively impacting generalization performance. In some implementations, the number of output units is two. For example, one output can represent a probability of an input pixel having skin tone while the second output can represent a probability of the input pixel not having skin tone. In some implementations, the neural networks include 7-5-2 multilayer perceptron (MLP) feedforward neural networks and 2-12-2 MLP feedforward neural networks. Classifiers are further described below in reference to FIG. 2. The skin tone detection system 104 can apply filters 112 to the probability map.

Filters 112 can include a morphology filter or a temporal queue filter. A morphology filter can isolate contiguous blobs of skin tone pixels and remove spurious noise from the probability map. The morphology filter is optional. A temporal queue filter can smooth the probability map by removing temporal noise from probability scores in a first-in-first-out (FIFO) fashion. The filters 112 can send the filtered values to the clamp 114. Details of both the morphology filter and the temporal queue filter will be further described below in reference to FIG. 2.

The clamp 114 limits values to be within a specified range. In some implementations, the clamp 114 limits the filtered values to be between 0 and 1. For example, the system can cap values that lie outside the specified range to the nearest limit. In some implementations, the clamp is applied on a per pixel basis. The clamped values can represent a probability of a user presence in the image source.

Figure 2:
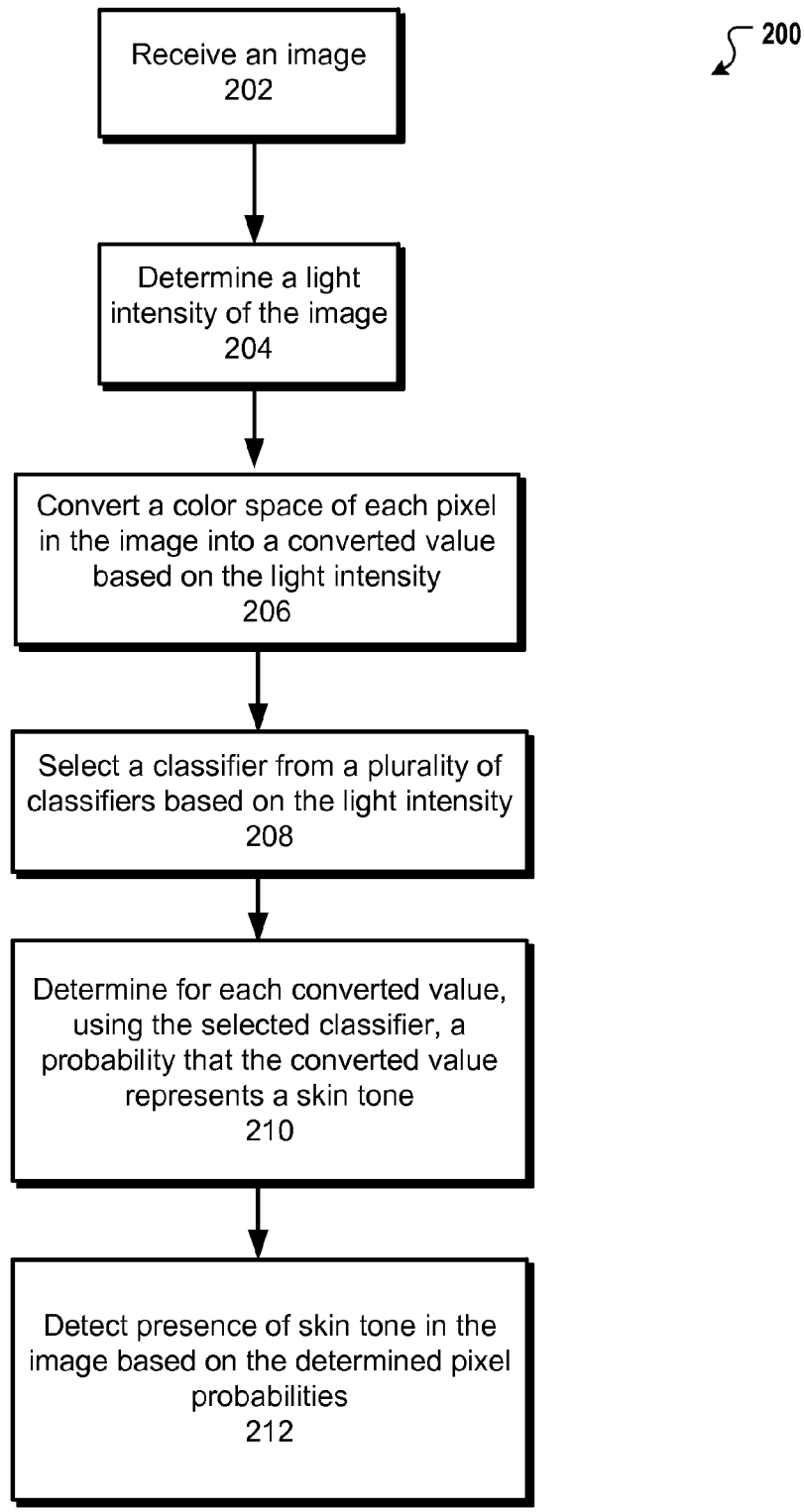
FIG. 2 is a flow diagram of an exemplary process for detecting skin tone.

FIG. 2 is a flow diagram of an exemplary process 200 for detecting skin tone. Process 200 can be implemented by the system 100 shown in reference to FIG. 1.

The process 200 receives an image 202. The process 200 determines a light intensity of the image 204. Images having a low light intensity can have more chroma noise than images having a high light intensity. Therefore, the process 200 applies a different color space conversion to the image depending on the light intensity 206. In some implementations, if the light intensity is low, the process 200 applies a normalized RGB conversion to each pixel in the image. For example, the process 200 calculates an X, nR, nG, and nB for each pixel. X can be the sum of the R, G, and B value of the pixel. nR can be R/X. nG can be G/X. nB can be B/X. The process 200 can convert each RGB value into a vector including R, G, B, nR, nG, nB, and X/3. In some implementations, if the light intensity is not low, the process 200 applies a YUV conversion to the image. For example, the process 200 converts each pixel from RGB into YUV using the following matrix:

$$\begin{bmatrix} Y \\ U \\ V \end{bmatrix} = \begin{bmatrix} 0.299 & 0.587 & 0.114 \\ -0.14713 & -0.28886 & 0.436 \\ 0.615 & -0.51499 & -0.10001 \end{bmatrix} \begin{bmatrix} R \\ G \\ B \end{bmatrix}$$

The process 200 can calculate quotient values of U/Y and V/Y for each pixel. The process 200 converts each RGB value into a vector including the U/Y and V/Y values.

Similar to the color space conversion computations, the process 200 selects a classifier based on the light intensity of the image 208. The selected classifier classifies the vectors including the converted values. For example, vectors associated with images having low light intensity (e.g., the 7-element vector including R, G, B, nR, nG, nB, and X/3) can be processed by a 7-5-2 MLP feedforward neural network per pixel classifier. Also, vectors associated with images having non-low light intensity (e.g., the 2-element vector including U/Y and V/Y) can be processed by a 2-12-2 MLP feedforward neural network per pixel classifier. In some implementations, the process 200 specifies more than one threshold of light intensity and uses various types of classifiers for each threshold.

Other color space conversion computations are possible. For example, the process can convert pixels into a RG-chromaticity space. For this color space, the process can generate a 2-element vector including nR and nG values for each pixel. Vectors can be processed by a 2-10-2 neural network classifier. In some implementations, the process converts pixels into another color space represented by a 4-element vector including nR, nG, nB, and R/G values. Vectors in this color space can be processed by a 4-8-2 neural network classifier. In some implementations, this color space is processed by a 4-12-2 neural network classifier.

By processing the vectors with a classifier, the classifier outputs a skin tone probability for each pixel 210. In some implementations, the process 200 represents a collection of pixel probabilities as a probability map. For example, the probability map can be represented in a gray scale probability image, as will be further described below in reference to FIG. 4. The process 200 detects presence of skin tone in the image based on the determined pixel probabilities (e.g., a probability map) 212. The classifiers classify pixels as being skin or not skin on a per-pixel basis using a per-pixel probability score. For each pixel, the classifiers compare the associated probability score to a threshold. In some implementations, the threshold is determined using a maximum a posteriori estimate. For example, if the probability of a pixel having skin tone is larger than the probability of not having skin tone, the classifiers classify the pixel as having skin tone. An example of applying a maximum a postieri estimate can be found at R. O. Duda, P. E. Hart, D. G. Stork, Pattern Classification, Wiley, 2001—Sections: 3.1, 3.2 and 3.9, which is hereby incorporated by reference in its entirety. On the other hand, the threshold can be set to an arbitrary value between 0 and 1.

If a pixel has a probability score greater than the threshold, the classifiers classify the pixel as having skin tone. Conversely, if a pixel does not have a probability score greater than the threshold, the classifiers classify the pixel as not having skin tone.

In some implementations, after classifying each pixel, the process can apply multiple techniques to determine whether there is sufficient skin tone in the image source to indicate that a user is present, as will be further described below in reference to FIG. 3.

Figure 3:
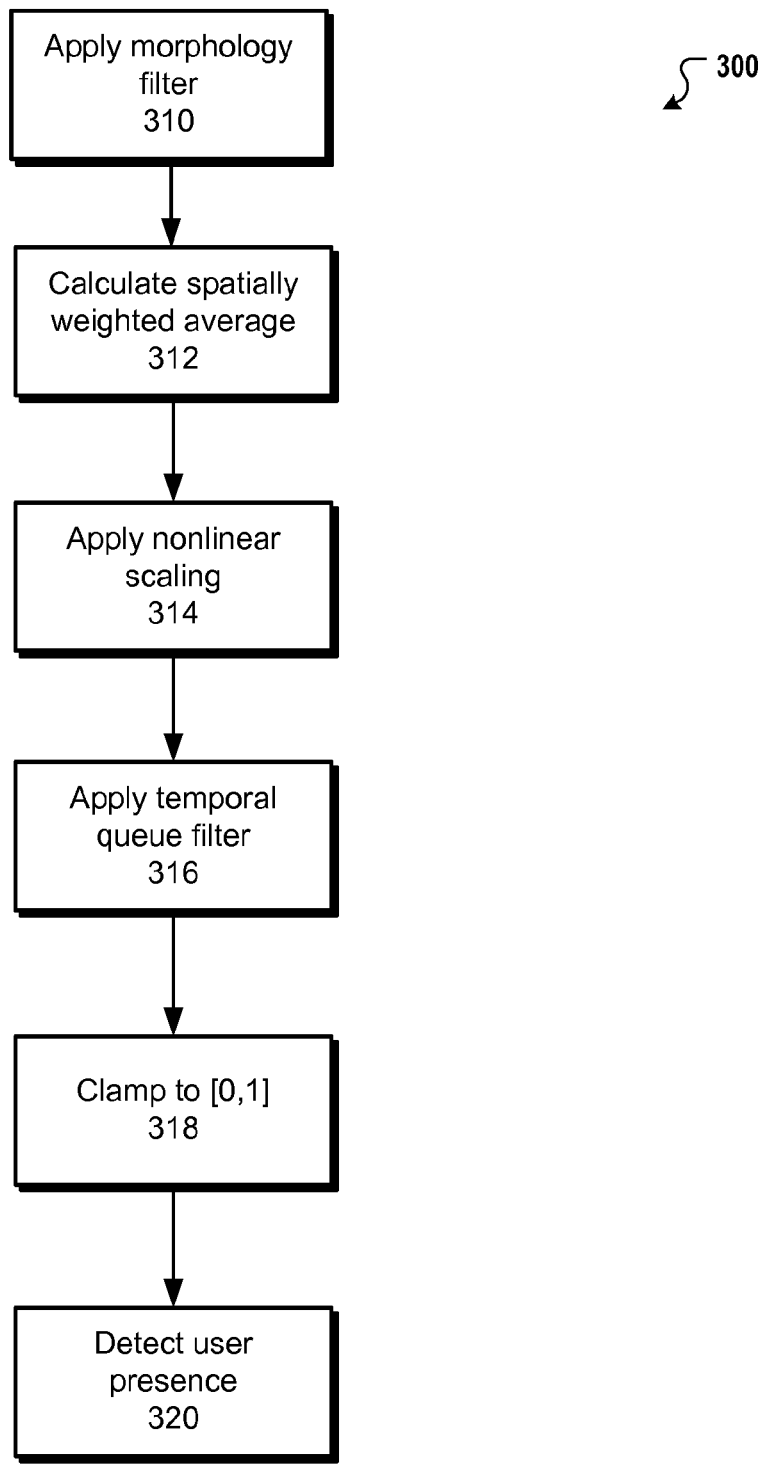
FIG. 3 is a flow diagram of exemplary techniques for detecting user presence based on skin tone.

FIG. 3 is a flow diagram of exemplary techniques 300 for detecting user presence based on skin tone. Process 300 can be implemented by the system 100 shown in reference to FIG. 1. The process 300 can optionally apply a morphology filter 310 to the image. Morphology filters are known processes that employ erosion and dilation techniques. In some implementations, the morphology filter is an open-close type with a kernel of 1.

The process 300 calculates a spatially weighted average 312 of the image 312 by integrating the per pixel probabilities of the image. In some implementations, the process 300 weights certain probabilities more than others using a weighted average integrator. For example, the values towards the center of the probability map can be weighed more than the values on the edges of the probability map. In some implementations, the process 300 integrates the output of the morphology filtered probability image. The integration can result in a single probability score (e.g., between 0 and 1). If the image source is in a video feed format, the process 300 can determine a single probability score for each input frame.

The process 300 applies a nonlinear scaling factor to the one or more integrated values 314. In some implementations, given an integrated value x, the nonlinear scaling factor is the square root of the product of a scalar factor $\alpha_x$ and x:$\sqrt{\alpha_x * x}$. In some implementations, the scalar factor is positive. For example, the scalar factor can be 0.4, 4, 40, 400, 4,000, or 40,000.

The process 300 then applies a temporal queue filter to the one or more scaled values 316. Multiple scaled values can be maintained in a queue (e.g., FIFO). The queue can have a length based on the image source frame rate, a time constant, and temporal behavior of the queue's output. For example, a queue filter can have the length of 5, 9, 13, 17, 21, 25, 29, 33, or more. New values can be added at one end of the queue and removed (e.g., popped off) at the other end. If the image source is from a video feed, at each time step, the values in the queue are advanced by one position. In some implementations, the queue uses a ring buffer. The output of the queue filter can be calculated using a mathematical operator applied to the values in the queue. For example, the queue filter can find the minimum, maximum, or median operators. The queue filter can also calculate an average value or a weighted average.

The process 300 can clamp the one or more filtered values to be between a specified range 318. In some implementations, the range is between 0 and 1. A value of 1 can represent a probability that a user is present while a value of 0 can represent a probability that a user is not present. The process 300 can detect user presence based on the range 320.

Figure 4:
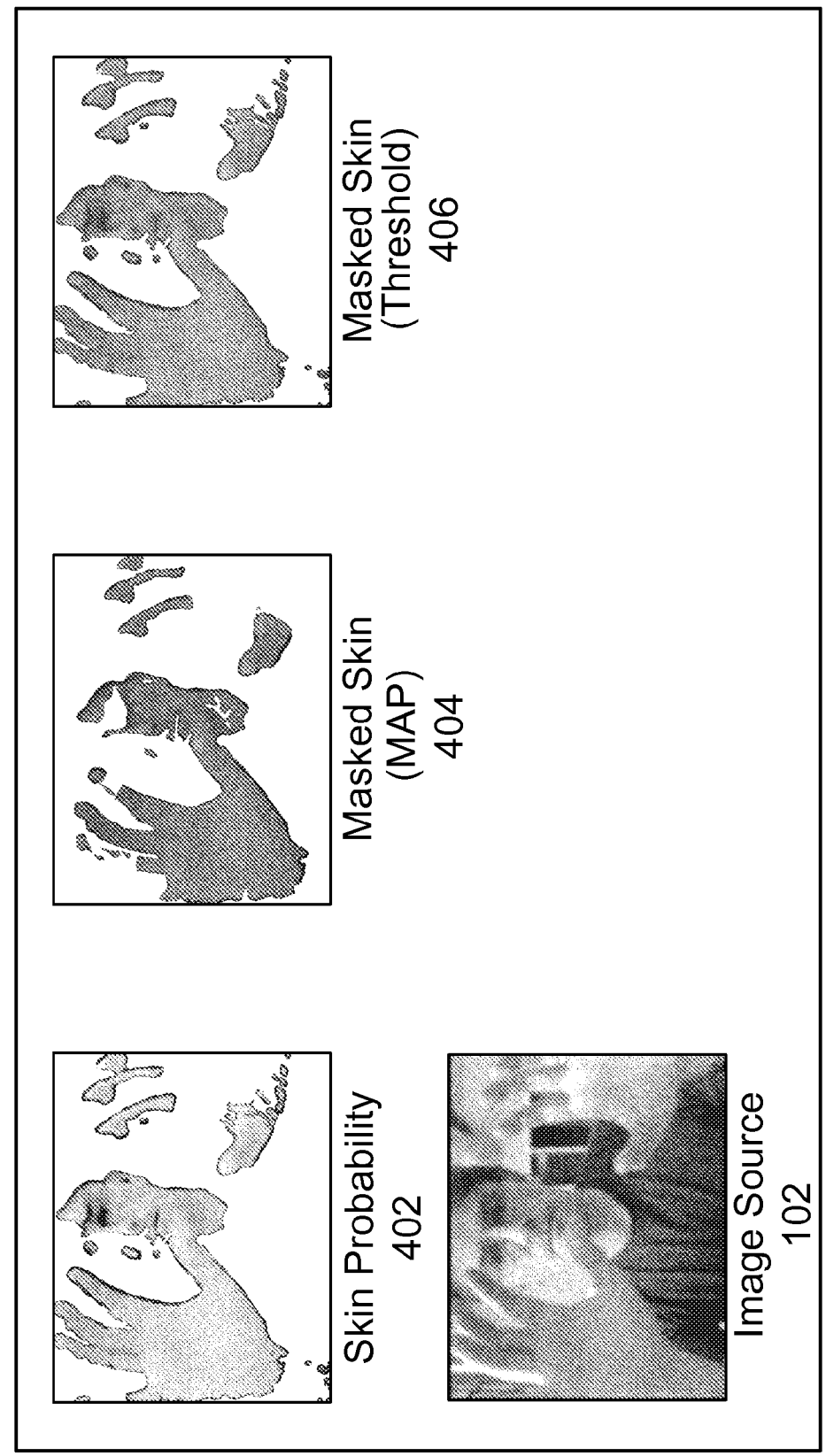
FIG. 4 is a series of exemplary images showing results on an image at various stages of the skin tone detection system.

FIG. 4 is a series of exemplary images showing results on an image at various stages of the skin tone detection system 104. After receiving an image from the image source 102, the system 104 can create a probability map 402 from classifiers as mentioned above. The probability map 402 displayed is a gray scale probability map. The non-white pixels in the probability map 402 represent a non-zero probability of being skin tone.

In some implementations, the system 104 uses masks to select regions of the image source 102 that contain skin tone pixels. The system 104 selects regions of the probability map 402 that satisfy a threshold. In some implementations, the threshold is a maximum a posterior probability (MAP) estimate. The MAP estimate can minimize the probability of incorrect classification. For example, the non-white pixels in an estimate mask 404 indicate the selected pixels from an initial image source 102.

In some implementations, the system 104 applies a user selected threshold to the probability map 404. If values in the probability map exceed the user selected threshold, the system 104 determines the image source 201 includes skin tones. For example, the non-white pixels in a threshold mask 406 have exceeded the user selected threshold.

Exemplary Device Architecture

Figure 5:
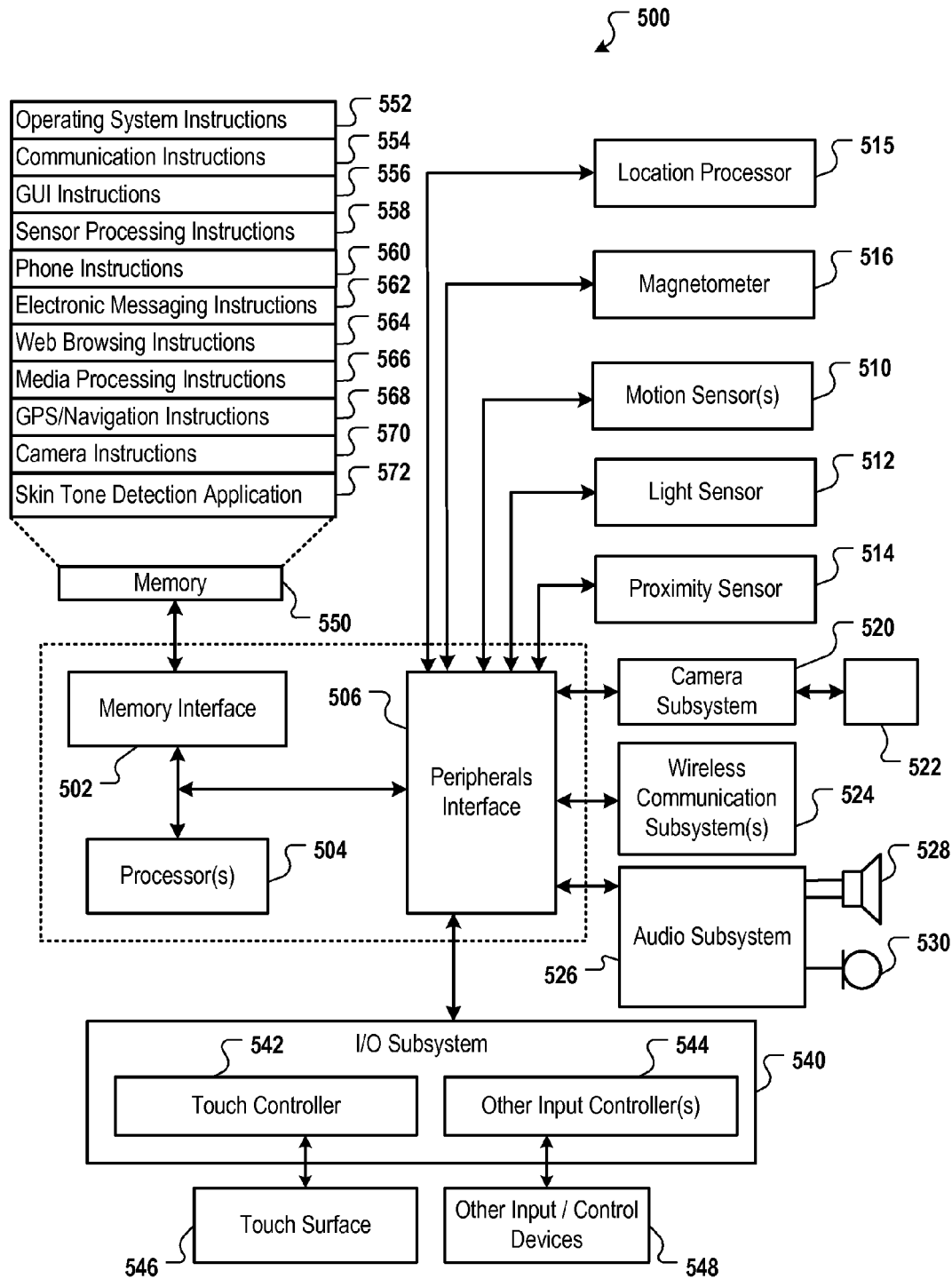
FIG. 5 is a block diagram of an exemplary architecture of a device capable of detecting skin tone.

FIG. 5 illustrates a block diagram of an exemplary architecture of a device capable of detecting skin tone. Architecture 500 can be implemented in any device for generating the features described in reference to FIGS. 1-4 including but not limited to portable or desktop computers, smart phones and electronic tablets, television systems, game consoles, kiosks and the like. Architecture 500 can include memory interface 502, data processor(s), image processor(s) or central processing unit(s) 504, and peripherals interface 506. Memory interface 502, processor(s) 504 or peripherals interface 506 can be separate components or can be integrated in one or more integrated circuits. The various components can be coupled by one or more communication buses or signal lines.

Sensors, devices, and subsystems can be coupled to peripherals interface 506 to facilitate multiple functionalities. For example, motion sensor 510, light sensor 512, and proximity sensor 514 can be coupled to peripherals interface 506 to facilitate orientation, lighting, and proximity functions of the device. For example, in some implementations, light sensor 512 can be utilized to facilitate adjusting the brightness of touch surface 546. In some implementations, motion sensor 510 (e.g., an accelerometer, gyros) can be utilized to detect movement and orientation of the device. Accordingly, display objects or media can be presented according to a detected orientation (e.g., portrait or landscape).

Other sensors can also be connected to peripherals interface 506, such as a temperature sensor, a biometric sensor, or other sensing device, to facilitate related functionalities.

Location processor 515 (e.g., GPS receiver) can be connected to peripherals interface 506 to provide geo-positioning. Electronic magnetometer 516 (e.g., an integrated circuit chip) can also be connected to peripherals interface 506 to provide data that can be used to determine the direction of magnetic North. Thus, electronic magnetometer 516 can be used as an electronic compass.

Camera subsystem 520 and an optical sensor 522, e.g., a charged coupled device (CCD) or a complementary metal-oxide semiconductor (CMOS) optical sensor, can be utilized to facilitate camera functions, such as recording photographs and video clips.

Communication functions can be facilitated through one or more communication subsystems 524. Communication subsystem(s) 524 can include one or more wireless communication subsystems. Wireless communication subsystems 524 can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data. The specific design and implementation of the communication subsystem 524 can depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 502.x communication networks (e.g., WiFi, WiMax, or 3G networks), code division multiple access (CDMA) networks, and a Bluetooth™ network. Communication subsystems 524 may include hosting protocols such that the device may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 526 can be coupled to a speaker 528 and one or more microphones 530 to facilitate voice-enabled functions, such as voice recognition, voice replication, digital recording, and telephony functions.

I/O subsystem 540 can include touch controller 542 and/or other input controller(s) 544. Touch controller 542 can be coupled to a touch surface 546. Touch surface 546 and touch controller 542 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 546. In one implementation, touch surface 546 can display virtual or soft buttons and a virtual keyboard, which can be used as an input/output device by the user.

Other input controller(s) 544 can be coupled to other input/control devices 548, such as one or more buttons, rocker switches, thumb-wheel, infrared port, USB port, and/or a pointer device such as a stylus. The one or more buttons (not shown) can include an up/down button for volume control of speaker 528 and/or microphone 530.

In some implementations, device 500 can present recorded audio and/or video files, such as MP3, AAC, and MPEG files. In some implementations, device 500 can include the functionality of an MP3 player and may include a pin connector for tethering to other devices. Other input/output and control devices can be used.

Memory interface 502 can be coupled to memory 550. Memory 550 can include high-speed random access memory or non-volatile memory, such as one or more magnetic disk storage devices, one or more optical storage devices, or flash memory (e.g., NAND, NOR). Memory 550 can store operating system 552, such as Darwin, RTXC, LINUX, UNIX, OS X, WINDOWS, or an embedded operating system such as VxWorks. Operating system 552 may include instructions for handling basic system services and for performing hardware dependent tasks. In some implementations, operating system 552 can include a kernel (e.g., UNIX kernel).

Memory 550 may also store communication instructions 554 to facilitate communicating with one or more additional devices, one or more computers or servers. Communication instructions 554 can also be used to select an operational mode or communication medium for use by the device, based on a geographic location (obtained by the GPS/Navigation instructions 568) of the device. Memory 550 may include graphical user interface instructions 556 to facilitate graphic user interface processing, such as generating the GUIs; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions and display GUIs; media processing instructions 566 to facilitate media processing-related processes and functions; GPS/Navigation instructions 568 to facilitate GPS and navigation-related processes; camera instructions 570 to facilitate camera-related processes and functions; and instructions 572 for a skin tone detection application that is capable of displaying GUIs. The memory 550 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 550 can include additional instructions or fewer instructions. Furthermore, various functions of the mobile device may be implemented in hardware and/or in software, including in one or more signal processing and/or application specific integrated circuits.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer can communicate with mass storage devices for storing data files. These mass storage devices can include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with an author, the features can be implemented on a computer having a display device such as a CRT (cathode ray tube) or LCD (liquid crystal display) monitor for displaying information to the author and a keyboard and a pointing device such as a mouse or a trackball by which the author can provide input to the computer.

The features can be implemented in a computer system that includes a back-end component, such as a data server or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a LAN, a WAN and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an Application Programming Interface (API). An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method, performed by one or more hardware processors, comprising:
receiving an image at a memory accessible by the one or more hardware processors;
determining, by the one or more hardware processors, a light intensity of the image;
converting, by the one or more hardware processors, a color space of each pixel in the image into a converted value based on the light intensity;
selecting, by the one or more hardware processors, a classifier from a plurality of classifiers based on the light intensity;
determining, by the one or more hardware processors, for each converted value, using the selected classifier, a probability that the converted value represents a skin tone;
detecting, by the one or more hardware processors, presence of skin tone in the image based on the determined pixel probabilities; and
detecting, by the one or more hardware processors, user presence based on the determined pixel probabilities, including determining a threshold, and selecting, for each probability in the determined pixel probabilities the probability that satisfies the threshold, where the threshold is determined by a maximum a postieri probability estimate.

2. The method of claim 1, where the image includes RGB values.

3. The method of claim 1, where the converting of each pixel is a RGB to YUV conversion.

4. The method of claim 1, where the converting of each pixel is a RGB to normalized RGB conversion.

5. The method of claim 1, where the classifier is a feedforward neural network.

6. The method of claim 1, further comprising:
applying a morphology filter to the determined pixel probabilities.

7. The method of claim 1, further comprising:
in response to the classifying, calculating a spatially weighted average for the image;
scaling the spatially weighted average nonlinearly;
applying a temporal queue filter to the spatially weighted average to generate a filtered value; and
clamping the filtered value.

8. The method of claim 1, where the threshold is selected by a user.

9. A non-transitory computer-readable medium having instructions stored thereon, which, when executed by a processor, cause the processor to perform operations comprising:
receiving an image;
determining a light intensity of the image;
converting a color space of each pixel in the image into a converted value based on the light intensity;
selecting a classifier from a plurality of classifiers based on the light intensity;
determining for each converted value, using the selected classifier, a probability that the converted value represents a skin tone;
detecting presence of skin tone in the image based on the determined pixel probabilities; and
detecting user presence based on the determined pixel probabilities, including determining a threshold, and selecting, for each probability in the determined pixel probabilities, the probability that satisfies the threshold, where the threshold is determined by a maximum a postieri probability estimate.

10. The computer-readable medium of claim 9, where the image includes RGB values.

11. The computer-readable medium of claim 9, where the converting of each pixel is a RGB to YUV conversion.

12. The computer-readable medium of claim 9, where the converting of each pixel is a RGB to normalized RGB conversion.

13. The computer-readable medium of claim 9, where the classifier is a feedforward neural network.

14. The computer-readable medium of claim 9, further comprising:
applying a morphology filter to the determined pixel probabilities.

15. The computer-readable medium of claim 9, further comprising:
in response to the classifying, calculating a spatially weighted average for the image;
scaling the spatially weighted average nonlinearly;
applying a temporal queue filter to the spatially weighted average to generate a filtered value; and
clamping the filtered value.

16. The computer-readable medium of claim 9, where the threshold is selected by a user.

17. A system comprising:
a processor; and
computer-readable medium coupled to the processor and having instructions stored thereon, which, when executed by the processor, cause the processor to perform operations comprising:
receiving an image;
determining a light intensity of the image;
converting a color space of each pixel in the image into a converted value based on the light intensity;
selecting a classifier from a plurality of classifiers based on the light intensity;
determining for each converted value, using the selected classifier, a probability that the converted value represents a skin tone;
detecting presence of skin tone in the image based on the determined pixel probabilities; and
detecting user presence based on the determined pixel probabilities, including determining a threshold, and selecting, for each probability in the determined pixel probabilities, the probability that satisfies the threshold, where the threshold is determined by a maximum apostieri probability estimate.

18. The system of claim 17, where the image includes RGB values.

19. The system of claim 17, where the converting of each pixel is a RGB to YUV conversion.

20. The system of claim 17, where the converting of each pixel is a RGB to normalized RGB conversion.

21. The system of claim 17, where the classifier is a feedforward neural network.

22. The system of claim 17, further comprising:
applying a morphology filter to the determined pixel probabilities.

23. The system of claim 17, further comprising:
in response to the classifying, calculating a spatially weighted average for the image;
scaling the spatially weighted average nonlinearly;
applying a temporal queue filter to the spatially weighted average to generate a filtered value; and
clamping the filtered value.

24. The system of claim 17, where the threshold is selected by a user.

* * * * *

UNITED STATES PATENT AND TRADEMARK OFFICE
CERTIFICATE OF CORRECTION

PATENT NO.         : 8,705,853 B2
APPLICATION NO.    : 13/452661
DATED              : April 22, 2014
INVENTOR(S)        : Rudolph van der Merwe Page 1 of 1

It is certified that error appears in the above-identified patent and that said Letters Patent is hereby corrected as shown below:

In the Claims:

Column 10, Line 22 at Claim 1:
    delete "postieri" and
    insert -- posteriori --, therefor.

Column 10, Line 63 at Claim 9:
    delete "postieri" and
    insert -- posteriori --, therefor.

Column 12, Lines 9-10 at Claim 17:
    delete "apostieri" and
    insert -- a posteriori --, therefor.

Signed and Sealed this
Thirtieth Day of September, 2014

Michelle K. Lee
*Deputy Director of the United States Patent and Trademark Office*